United States Patent
Hahm et al.

(10) Patent No.: US 8,848,254 B2
(45) Date of Patent: Sep. 30, 2014

(54) HALFTONE SCREEN PRODUCING APPARATUS, PRINT CONTROLLING APPARATUS, IMAGE FORMING APPARATUS, METHOD OF PRODUCING HALFTONE SCREEN, METHOD OF CONTROLLING PRINTING, METHOD OF FORMING IMAGE, AND COMPUTER-READABLE RECORDING MEDIUM

(75) Inventors: Jong-min Hahm, Suwon-si (KR); Chang-hyung Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 188 days.

(21) Appl. No.: 13/300,885

(22) Filed: Nov. 21, 2011

(65) Prior Publication Data
US 2012/0274978 A1    Nov. 1, 2012

(30) Foreign Application Priority Data

Apr. 29, 2011  (KR) .................. 10-2011-0040545

(51) Int. Cl.
*H04N 1/40* (2006.01)
*H04N 1/405* (2006.01)

(52) U.S. Cl.
CPC .................. *H04N 1/4051* (2013.01)
USPC ............. 358/3.2; 358/3.23; 358/3.3

(58) Field of Classification Search
USPC ...................................... 358/1.15
See application file for complete search history.

(56) References Cited

U.S. PATENT DOCUMENTS

2006/0152767 A1*  7/2006  Asai et al. ............ 358/3.23
2009/0097074 A1*  4/2009  Kawamura ............ 358/3.13

FOREIGN PATENT DOCUMENTS

EP    1528789    5/2005
EP    1679880    7/2006

OTHER PUBLICATIONS

Hakan Ancin, New void-and-cluster method for imporve halftone uniformity, 1999,Jounal of eletronic image, 9, 104-111.*
European Search Report issued on Dec. 14, 2011 in EP Patent Application No. 11185820.5.
Ancin, H et al.: "New Void -And-Cluster Method for Improved Halftone Uniformity" Journal of Electronic Imaging, SPIE / IS & T, vol. 8 , No. 1, Jan. 1999, pp. 104-111, XP000801644, ISSN: 1017-9909, DOI: 10,1117/1.482701.
Ostromoukhov, V: "Pseudo-Random Halftone Screening for Color and Black & White Printing", 9th International Congress in Non-Impact Printing Technologies/ Japan Hardcopy 93, Oct. 4, 1993, pp. 1-8, XP007910323.

(Continued)

*Primary Examiner* — King Poon
*Assistant Examiner* — Andrew H Lam
(74) *Attorney, Agent, or Firm* — Stanzione & Kim, LLP

(57) ABSTRACT

A halftone screen producing apparatus is provided. The halftone screen producing apparatus includes: an input unit to receive screen information, a dot center arrangement unit to arrange dot centers within a screen based on the screen information, a Voronoi calculation unit to calculate a Voronoi value for each dot within the screen in which the dot centers are arranged, a filter calculation unit to calculate a filter value for each dot within the screen in which the dot centers are arranged, and a dot value setting unit to set a dot value within the screen based on the calculated Voronoi value and the calculated filter value.

16 Claims, 16 Drawing Sheets

(56) References Cited

OTHER PUBLICATIONS

Secord, A ED—Spencer S N (ED): "Weighted Voronoi Stippling", NPAR 2002, Symposium on Non-Photorealistic Animation and Rendering. Annecy, France, Jun. 3-5, 2002; [Symposium on Non-Photorealistic Animation and Rendering], New York, NY: ACM, US, Jun. 3, 2002, pp. 37-43 XP001201008, DOI: 10.1145/508530. 508537 ISBN: 978-1-58113-494-0.

* cited by examiner

200lpi @ 600dpi
Number of Centers:
1820

150lpi @ 600dpi
Number of Centers:
1024 g=85　　　　g=115　　　　g=145

HALFTONE SCREEN PRODUCING APPARATUS, PRINT CONTROLLING APPARATUS, IMAGE FORMING APPARATUS, METHOD OF PRODUCING HALFTONE SCREEN, METHOD OF CONTROLLING PRINTING, METHOD OF FORMING IMAGE, AND COMPUTER-READABLE RECORDING MEDIUM

CROSS-REFERENCE TO RELATED APPLICATIONS

This application claims the benefit under 35 U.S.C. §119 from Korean Patent Application No. 10-2011-0040545, filed Apr. 29, 2011, in the Korean Intellectual Property Office, the disclosure of which is incorporated herein by reference in its entirety.

BACKGROUND

1. Field

The present general inventive concept generally relates to a halftone screen producing apparatus, a print controlling apparatus, an image forming apparatus, a method of producing a halftone screen, a method of controlling printing, a method of forming an image, and a computer-readable recording medium.

2. Description of the Related Art

In general, an image forming apparatus refers to an apparatus that prints print data generated in a terminal apparatus, such as a computer, on recording paper. Examples of such an image forming apparatus include copiers, printers, facsimile machines, and multifunction peripherals (MFP), which combine the aforementioned devices in a single device.

Such apparatuses have a limited capability to reproduce tones and use halftoning to represent a high number of tones. Halftoning is a method that converts an original image having a high value or level of detail per one pixel into an image having a low value or level of detail per one pixel, and generally creates an image having two tones.

In order to perform halftoning, the image forming apparatus uses a screen with a limited size. The screen is formed in a grid pattern, having squares with horizontally and vertically limited sizes, and one integer value is assigned to each square. In performing the halftoning, one square on the screen corresponds to one pixel of the original image. For example, if halftoning is to be performed with respect to an image of 10 m*10 n using a screen of m*n, the halftoning is performed by tiling the screen 10*10 times, vertically and horizontally.

Quality of the halftoned image may be affected by the screen. Depending on the screen, a degree of softness of the image or a size of a pattern may be different and a resultant printed image may be good or not. Accordingly, it is important to manufacture a screen capable of improving the quality of an image.

A related art method uses an ordered screen in which dots have a uniform gap therebetween. However, the ordered screen has a specific angle and a specific frequency and, as a result, incurs an interference pattern, such as moiré, when color printing.

In order to solve this problem, a method using a stochastic screen has been suggested. However, a related art stochastic screen is normally used at high resolution of 1200 dpi or more, but may deteriorate image quality at low resolution.

SUMMARY

The present general inventive concept provides a halftone screen producing apparatus, a print controlling apparatus, an image forming apparatus, a method of producing a halftone screen, a method of controlling print, a method of forming an image, and a non-transitory computer-readable recording medium, which can generate a halftone screen that decreases incidence of moiré and/or low frequency noise even when printing at low resolution.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a halftone screen producing apparatus, including: an input unit to receive screen information, a dot center arrangement unit to arrange dot centers within a screen based on the screen information, a Voronoi calculation unit to calculate a Voronoi value for each dot within the screen in which the dot centers are arranged, a filter calculation unit to calculate a filter value for each dot within the screen in which the dot centers are arranged, and a dot value setting unit to set a dot value within the screen based on the calculated Voronoi value and the calculated filter value.

The foregoing and/or other features and utilities of the present general inventive concept may also be achieved by providing a print controlling apparatus, including: a user interface unit to receive a command to print a document, a print data generation unit to generate print data for the document by applying a halftone screen, and a communication interface unit to transmit the generated print data to an image forming apparatus, wherein the halftone screen is a stochastic screen to which a Voronoi division and a low pass filter are applied.

The halftone screen may be based on a sum value of a weighted Voronoi value and a weighted filter value for each dot within a screen.

The print controlling apparatus may further include a storage unit to store at least one halftone screen; and a screen selection unit to select a halftone screen to be applied to the document from the at least one halftone screen stored in the storage unit, wherein the user interface unit receives a print option, the screen selection unit selects the halftone screen according to print option information, the print option information including print quality, whether color printing is performed, and whether an edge is improved, and the print data generation unit generates the print data using the selected halftone screen.

The foregoing and/or other features and utilities of the present general inventive concept may also be achieved by providing an image forming apparatus, including: a communication interface unit to receive print data, a rendering unit to render the received print data by applying a halftone screen, and an image forming unit to output the rendered print data, wherein the halftone screen is a stochastic screen to which a Voronoi division and a low pass filter are applied.

The halftone screen may be based on a sum value of a weighted Voronoi value and a weighted filter value for each dot within a screen.

The image forming apparatus may further include a storage unit to store at least one halftone screen; and a screen selection unit to select a halftone screen to be applied to the print data from the at least one halftone screen stored in the storage unit, wherein the screen selection unit selects the halftone screen according to print option information, the print option information including print quality, whether color printing is performed, and whether an edge is improved, and the rendering unit renders the print data using the selected halftone screen.

The foregoing and/or other features and utilities of the present general inventive concept may also be achieved by providing a halftone screen producing method, including: receiving screen information, arranging dot centers within a screen based on the screen information, calculating a Voronoi value for each dot within the screen in which the dot centers are arranged, calculating a filter value for each dot within the screen in which the dot centers are arranged, and setting a dot value within the screen based on the calculated Voronoi value and the calculated filter value.

The foregoing and/or other features and utilities of the present general inventive concept may also be achieved by providing a print controlling method, including: receiving a command to print a document, generating print data for the document by applying a halftone screen, and transmitting the generated print data, wherein the halftone screen is a stochastic screen to which a Voronoi division and a low pass filter are applied.

The print controlling method may further include receiving a selection of a print option to be applied to the document; and selecting a halftone screen to be applied to the document from at least one pre-stored halftone screen, wherein the selecting includes selecting the halftone screen according to print option information, the print option information including print quality, whether color printing is performed, and whether an edge is improved, and wherein the generating the print data comprises generating the print data using the selected halftone screen.

The halftone screen may be based on a sum value of a weighted Voronoi value and a weighted filter value for each dot within a screen.

The print controlling method may further include generating the halftone screen, the generating including receiving screen information; arranging dot centers within a screen based on the screen information; calculating a Voronoi value for each dot within the screen in which the dot centers are arranged; calculating a filter value for each dot within the screen in which the dot centers are arranged; setting a dot value within the screen based on the calculated Voronoi value and the calculated filter value; and if values are not set for all of the dots within the screen, repeating the calculating of the filter value and the setting of the dot value until values are set for all of the dots within the screen.

The calculating the filter value may include setting a Gaussian value for each of the plurality of dot centers; overlapping the Gaussian values for the plurality of dot centers; and calculating the filter value for each dot within the screen.

The calculating the filter value may include calculating the filter value for each dot within the screen according to the following equation:

$$G(i, j) = \sum_{k=1}^{n} F(C_i(k) - i, C_j(k) - j)$$

wherein $G(i,j)$ is a filter value for a dot $(i,j)$ within a screen, F is a Gaussian filter, $C_i(k)$ is an i coordinate of a kth dot center, $C_j(k)$ is a j coordinate of the kth dot center, and n is a total number of dot centers.

The foregoing and/or other features and utilities of the present general inventive concept may also be achieved by providing an image forming method, including: receiving print data, rendering the received print data by applying a halftone screen, and printing the rendered print data, wherein the halftone screen is a stochastic screen to which a Voronoi division and a low pass filter are applied.

The image forming method may further include selecting a halftone screen to be applied to the print data from at least one pre-stored halftone screen, wherein the selecting includes selecting the halftone screen according to print option information, the print option information comprising print quality, whether color printing is performed, and whether an edge is improved, and wherein the rendering comprises rendering the print data using the selected halftone screen.

The halftone screen may be based on a sum value of a weighted a Voronoi value and a weighted filter value for each dot within a screen.

The image forming method may further include generating the halftone screen, the generating comprising: receiving screen information; arranging dot centers within a screen based on the received screen information; calculating a Voronoi value for each dot within the screen in which the dot centers are arranged; calculating a filter value for each dot within the screen in which the dot centers are arranged; setting a dot value within the screen based on the calculated Voronoi value and the calculated filter value; and if values are not set for all of the dots within the screen, repeating the calculating of the filter value and the setting of the dot value until values are set for all of the dots within the screen.

The calculating the filter value may include setting a Gaussian value for each of the plurality of dot centers; overlapping the Gaussian values for the plurality of dot centers; and calculating the filter value for each dot within the screen.

The calculating the filter value may include calculating the filter value for each dot within the screen according to the following equation:

$$G(i, j) = \sum_{k=1}^{n} F(C_i(k) - i, C_j(k) - j)$$

wherein $G(i,j)$ is a filter value for a dot $(i,j)$ within the screen, F is a Gaussian filter, $C_i(k)$ is an i coordinate of a kth dot center, $C_j(k)$ is a j coordinate of the kth dot center, and n is a total number of dot centers.

The foregoing and/or other features and utilities of the present general inventive concept may also be achieved by providing a non-transitory computer-readable recording medium including a program for executing a halftone screen producing method, including: receiving screen information, arranging dot centers within a screen based on the screen information, calculating a Voronoi value for each dot within the screen where the dot centers are arranged, calculating a filter value for each dot within the screen where the dot centers are arranged, and setting a dot value within the screen based on the calculated Voronoi value and the calculated filter value.

The foregoing and/or other features and utilities of the present general inventive concept may also be achieved by providing a non-transitory computer-readable recording medium including a program for executing a print controlling method, the print controlling method including: receiving a command to print a document, generating print data for the document by applying a halftone screen; and transmitting the generated print data, wherein the halftone screen is a stochastic screen to which a Voronoi division and low pass filter are applied.

The foregoing and/or other features and utilities of the present general inventive concept may also be achieved by providing a non-transitory computer-readable recording medium including a program for executing an image forming method, the image forming method including: receiving print data, rendering the received print data by applying a halftone screen, and printing the rendered print data, wherein the halftone screen is a stochastic screen to which a Voronoi division and low pass filter are applied.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE ILLUSTRATED EMBODIMENTS

Figure 1:
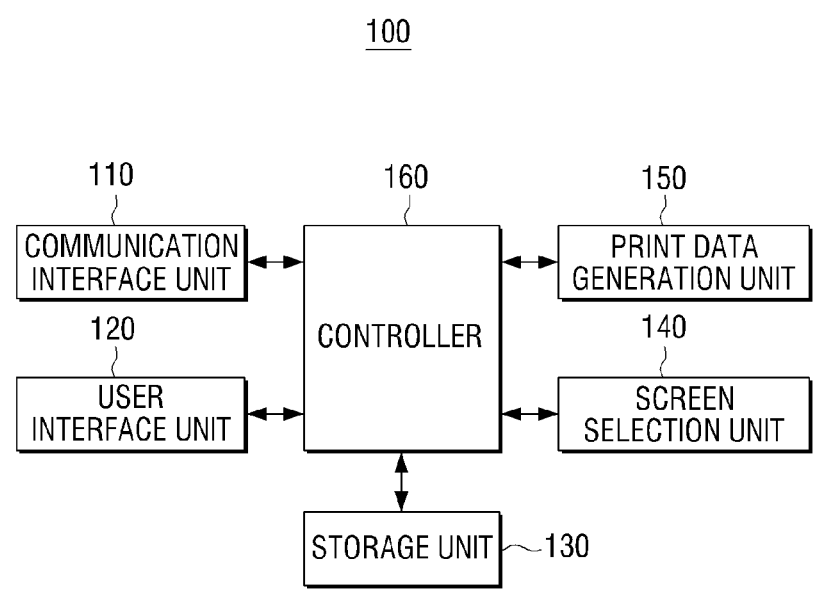
FIG. 1 is a block diagram illustrating a print controlling apparatus according to an exemplary embodiment.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a block diagram illustrating a print controlling apparatus according to an exemplary embodiment. Referring to FIG. 1, a print controlling apparatus 100 includes a communication interface unit 110, a user interface unit 120, a storage unit 130, a screen selection unit 140, a print data generation unit 150, and a controller 160.

Figure 2:
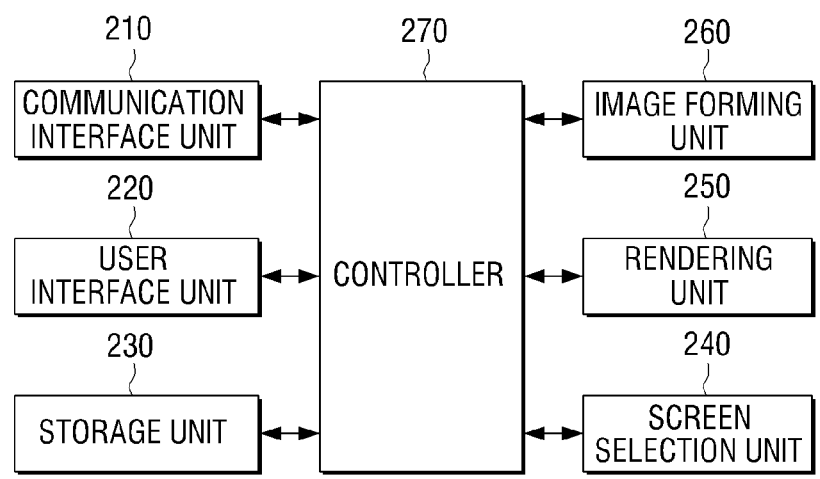
FIG. 2 is a block diagram illustrating an image forming apparatus according to an exemplary embodiment.

If the print controlling apparatus 100 is connected to an image forming apparatus, for example, an image forming apparatus 200 as shown in FIG. 2, the communication interface unit 110 provides print data and a print option of a format that can be processed by the image forming apparatus 200 to the image forming apparatus 200. The print data that can be processed by the image forming apparatus 200 includes page description language (PDL) data and an XPS file written in a printer command language (PCL) or a post script (PS) language. The print option may be transmitted and/or received as print option information and may be included in the print data or separate therefrom. More specifically, the communication interface unit 110 is adapted to connect the print controlling apparatus 100 to an external apparatus and may be a parallel port, a universal serial bus (USB) port, a wireless port, or the like.

The user interface unit 120 is may include a plurality of function keys through which a user sets or selects various functions supported by the print controlling apparatus 100, and displays a variety of information provided by the print controlling apparatus 100. The user interface unit 120 may be realized by a device implementing input and output simultaneously, such as a touch pad or a touch screen, or may be realized by a device combining a mouse and a monitor. Also, the user interface unit 120 may display a document that can be output. Accordingly, the user may set a document he/she intends to print and a print option for the corresponding document through a user interface window provided by the user interface unit 120. The user may input a command to print a selected document through the user interface window provided by the user interface unit 120.

The storage unit 130 stores a plurality of halftone screens. The halftone screen stored in the storage unit 130 is a stochastic screen to which Voronoi division and a low pass filter are applied. More specifically, such a stochastic screen is a screen that is produced based on a sum value of a weighted Voronoi value and a weighted filter value for each dot in a screen, and that is produced by a halftone screen producing apparatus 300, which will be described below. The storage unit 130 may be realized by a storage medium in the print controlling apparatus 100; an external storage medium; a removable disk, including a universal serial bus (USB) memory; a web server connected through a network, or the like.

The screen selection unit 140 selects a halftone screen to be applied to a document from among the plurality of halftone screens. More specifically, the screen selection unit 140 may select the halftone screen to be applied to the document, for which a command to print is input, from among the plurality of halftone screens stored in the storage unit 130, considering the print option selected by the user through the user interface unit 120.

Halftoning is an operation of converting an image represented in a multi-level into an image of a binary level, and quality of a document varies according to how the halftoning is performed. Accordingly, the image forming apparatus may perform halftoning using a different halftone screen according to print quality selected by the user.

As such, the screen selection unit 140 receives a setting condition of the print option regarding the print quality (for example, print quality (high quality printing, normal printing, high speed printing), whether color printing is set, and whether an edge is improved), and selects the halftone screen to be applied. More specifically, the screen selection unit 140 may select a halftone screen having a high screen frequency if high quality printing is set, and may select a halftone screen having a low screen frequency if normal printing or high speed printing is set.

The halftoning may be performed in the print controlling apparatus 100 or may be performed in the image forming apparatus 200. Accordingly, if the halftoning is performed in the image forming apparatus 200, the screen selection unit 140 receives information, such as a type of halftoning screen that the image forming apparatus 200 can perform and an applied condition, through the communication interface unit 110, and selects the halftone screen based on the received information.

The print data generation unit 150 generates print data for the document by applying the halftone screen. More specifically, the print data generation unit 150 may generate print data using the halftone screen selected by the screen selection unit 140.

If the halftoning is performed in the image forming apparatus 200, the print data generation unit 150 may generate print data including information on the halftone screen selected by the screen selection unit 140. The screen selection unit 140 and the print data generation unit 150 may be separate elements, but the screen selection unit 140 and the print data generation unit 150 may be integrated into one element, for example, in a general printer driver.

The controller 160 controls the elements of the print controlling apparatus 100. More specifically, if a command to print is input through the user interface unit 120, the controller 160 may control the user interface unit 120 to display the user interface window to receive a print option for a corresponding document.

Also, the controller 160 may control the screen selection unit 140 to select a halftone screen corresponding to the print option selected by the user, and may control the print data generation unit 150 to generate print data to which the selected halftone screen is applied.

The controller 160 may control the communication interface unit 110 to transmit the generated print data to the image forming apparatus 200. The controller 160 may control the storage unit 130 to store the print data generated by the print data generation unit 150. More specifically, the generated print data may be stored in the storage unit 130 so that printing of the document selected by the user may be used repeatedly.

The print controlling apparatus 100 performs printing using the halftone screen that does not incur moiré and/or low frequency noise even if the printing is performed at a low resolution, and as a result, improves quality of an output image.

FIG. 2 is a block diagram illustrating an image forming apparatus according to an exemplary embodiment. Referring to FIG. 2, an image forming apparatus 200 includes a communication interface unit 210, a user interface unit 220, a storage unit 230, a screen selection unit 240, a rendering unit 250, an image forming unit 260, and a controller 270.

If the image forming apparatus 200 is connected to the print controlling apparatus 100, the communication interface unit 210 receives print data and a print option from the print controlling apparatus 100. More specifically, the communication interface unit 210 is adapted to connect the image forming apparatus 200 to an external apparatus, and may be a parallel port, an USB port, a wireless port, or the like. The print data and the print option may be separately transmitted, or the print option may be included in the print data, in which case only the print data may be received.

The user interface unit 220 may include a plurality of function keys through which a user sets or selects various functions supported by the image forming apparatus 200, and displays a variety of information provided by the image forming apparatus 200. The user interface unit 220 may be realized by a device implementing input and output simultaneously, such as a touch pad or touch screen, or may be realized by a device combining a mouse and a monitor.

The storage unit 230 stores the print data. More specifically, the storage unit 230 may store the print data and the print option received through the communication interface unit 210. The storage unit 230 stores a plurality of halftone screens. The halftone screen stored in the storage unit 230 is a stochastic screen to which Voronoi division and a low pass filter are applied. More specifically, the stochastic screen is a screen that is produced based on a sum value of a weighted Voronoi value and a weighted filter value for each dot in the screen, and that is produced by the halftone screen producing apparatus 300, which will be explained in detail below. The storage unit 230 may be realized by a storage medium in the image forming apparatus 200; an external storage medium; a removable disk, including a USB memory; a web server connected through a network, or the like.

The screen selection unit 240 selects a halftone screen to be applied to the print data from among the plurality of halftone screens. More specifically, the screen selection unit 240 may select the halftone screen to be applied to the received print data from among the plurality of halftone screens stored in the storage unit 230, considering the print option set for the print data.

The halftoning is an operation of converting an image represented in a multi-level into an image of a binary level, and quality of a document varies according to how the halftoning is performed. Accordingly, the image forming apparatus may perform halftoning using a different halftone screen according to print quality selected by the user.

As such, the screen selection unit 240 receives a setting condition of the print option regarding the print quality (for example, print quality (high quality printing, normal printing, and high speed printing), whether color printing is set, and whether an edge is improved), and selects the halftone screen. More specifically, the screen selection unit 240 may select a halftone screen with a high screen frequency if high quality printing is set, and may select a halftone screen with a low screen frequency if normal printing or high speed printing is set.

The rendering unit 250 renders the received print data by applying the stochastic screen to which the Voronoi division and the low pass filter are applied. More specifically, the rendering unit 250 renders the print data by performing halftoning with respect to the print data received through the communication interface unit 210 using the halftone screen selected by the screen selection unit 240.

The image forming unit 260 prints and/or outputs the rendered print data.

The controller 270 controls the elements of the image forming apparatus 200. More specifically, if the print data and the print option, or the print data including the print option, are received through the communication interface unit 210, the controller 270 may control the screen selection unit 2540 to select the halftone screen.

If the halftone screen is selected, the controller 270 may control the rendering unit 250 to render according to the selected halftone screen, and may control the image forming unit 260 to print and/or output the rendered print data.

Referring to FIG. 2, the halftone screen is selected in the image forming apparatus 200. However, if the image forming apparatus 200 is connected to the print controlling apparatus 100 as shown in FIG. 1, the halftone screen may be selected in the print controlling apparatus 100 and the image forming apparatus 200 may use information on the halftone screen transmitted from the print controlling apparatus 100.

The image forming apparatus 200 prints using the halftone screen that does not incur moiré and/or low frequency noise even when printing at low resolution, and as a result, improves quality of an output image.

Figure 3:
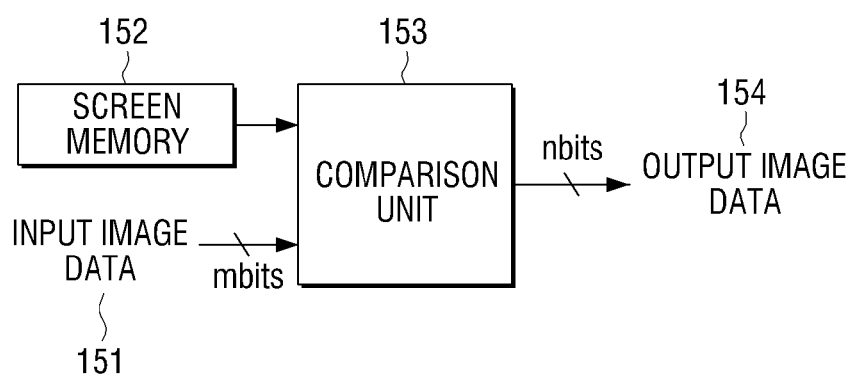
FIG. 3 is a block diagram illustrating a halftoning operation according to an exemplary embodiment.

FIG. 3 is a block diagram illustrating a halftoning operation. The halftoning operation may be performed, for example, in the rendering unit 250 of FIG. 2. As such, the halftoning operation will be described with reference to the rendering unit 250 of FIG. 2 but aspects are not limited thereto. Referring to FIG. 3, the rendering unit 250 includes a screen memory 152 and a comparison unit 153.

The screen memory 152 stores the halftone screen for one or more channels, e.g., cyan, magenta, yellow, and black. Here, the halftone screen is described as stored in the rendering unit 250, but may be stored in the above-described storage unit 230.

The comparison unit 153 compares print data 151 received through the communication interface unit 210 and screen data stored in the screen memory 152, and outputs output image data 154. The print data 151 may be input image data as shown in FIG. 3, and may include a print option as described above; however, aspects need not be limited thereto. Data that is m bits long per one pixel is converted into data that is n bits long per one pixel (n is less than m) and output as the output image data 154.

Figure 4:
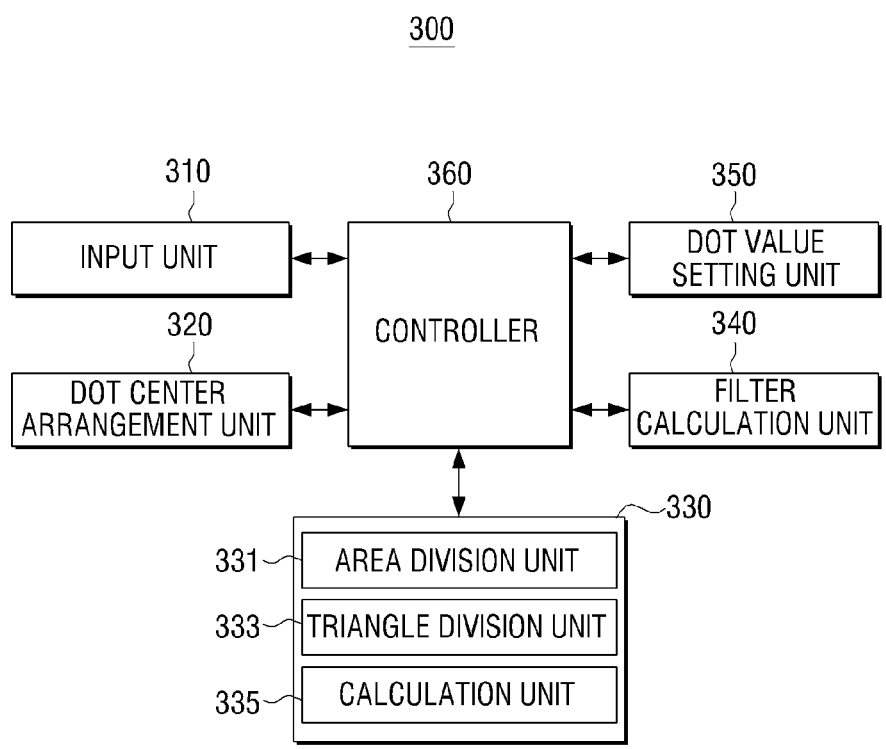
FIG. 4 is a block diagram illustrating a halftone screen producing apparatus according to an exemplary embodiment.

FIG. 4 is a block diagram illustrating a halftone screen producing apparatus according to an exemplary embodiment. Referring to FIG. 4, a halftone screen producing apparatus 300 includes an input unit 310, a dot center arrangement unit 320, a Voronoi calculation unit 330, a filter calculation unit 340, a dot value setting unit 350, and a controller 360.

The input unit 310 receives screen information. More specifically, the input unit 310 may receive the screen information through an external apparatus (not shown) or a user interface window. The screen information may be information on the screen, such as a screen size, a screen frequency, a constant value for determining a dot growth shape, and the number of dot centers.

The screen size is a size of a halftone screen to be produced, and may be 128*128, for example. The screen frequency is a frequency of the halftone screen to be produced and may be 200 lpi, 180 lpi, or 150 lpi, for example. The constant value for determining the dot growth shape is a constant value for determining a dot shape growing when a dot grows, which will be described below. As the constant value is greater, the dot grows in a round shape, and as the constant value is lower, the dot grows in a sharp shape. The constant value for determining the dot growth shape may be in inverse proportion to the screen frequency. In other words, if the screen frequency is input, the constant value for determining the dot growth shape may be calculated using the input screen frequency.

The number of dot centers is the number of dot centers arranged within the screen. The number of dot centers may be calculated using the screen size and the screen frequency. On the contrary, if the screen size and the number of dot centers are set, the screen frequency may be calculated. For example, if the screen size is set to 128*128 and the number of dot centers is set to 1536, the screen frequency may be about 180 lpi when the screen outputs 600 dpi.

The dot center arrangement unit 320 arranges the dot centers in the screen based on the input screen information. More specifically, the dot center arrangement unit 320 calculates the number of dot centers based on the screen size and the screen frequency of the screen information, and arranges the dot centers in the screen using a direct binary search (DBS) algorithm for the calculated number of dot centers. The dot center arrangement unit 320 may transform the DBS algorithm to determine in what order the dots are turned on in order to create a soft screen. Through this process, a uniform stochastic pattern, which is visually desirable, may be created in a highlighted area.

The DBS algorithm is an algorithm that compares an original image and a currently processed halftone image and creates an error value, and may be used to find a halftone image. A method of obtaining an error value in the DBS algorithm will be explained below with reference to FIG. 5.

Figure 5:
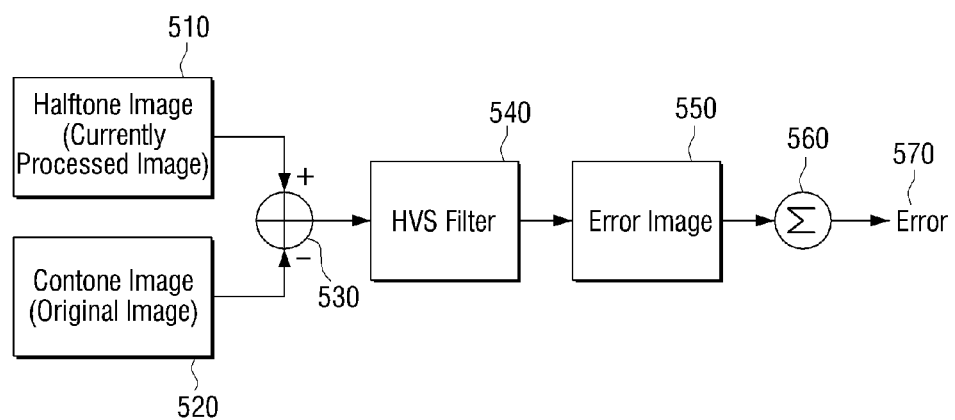
FIG. 5 is a block diagram illustrating a method of obtaining an error value in a direct binary search (DBS) algorithm according to an exemplary embodiment.

FIG. 5 is a block diagram illustrating a method of obtaining an error value in the DBS algorithm according to an exemplary embodiment. Referring to FIG. 5, a currently processed image 510 and an original image 520 are compared (530) and a difference image is generated. An error image 550 is generated by applying a human visual system (HVS) filter 540 to the difference image. An error value 570 is generated by summing (560) all pixel values of the error image 550.

The DBS algorithm causes a change in the currently processed halftone image in a direction of reducing the calculated error value as shown in FIG. 5. In order to change the halftone image, toggle calculating (specifically, tuning on or off a specific dot) or swap calculating (specifically, changing positions of dots of different values) may be used. In the process of manufacturing a screen, the DBS algorithm may be implemented with an original image in which all dot values are set to a gray level value that the halftoning intends to represent.

The quality of the stochastic screen is greatly affected by distribution of the dot centers. In other words, a better stochastic screen can be created if the dot centers are more uniformly distributed. As such, in order to increase the uniformity of the distribution of the dot centers when all of the dot centers are turned on, an image is created first when all of the dot centers are turned on and then an order of the dot centers is determined by turning off the dots one by one.

More specifically, the calculated number of dot centers are distributed over the screen and an image having a lowest error value is obtained using only the swap calculation. Then, an order of turning off the dots which have been already turned on is determined using only the toggle calculation. If these operations are performed in the reverse order, an order of tuning on the dot centers from an initial state in which none of the dots is turned on may be determined.

The dot centers are arranged on the screen and a dot cluster grows with reference to each dot center so that the halftone screen can be produced. The growing operation of the dot cluster may be performed using a Voronoi value and a filter value, which will be described below. Hereinafter, an operation of setting a dot value in the screen using the Voronoi value and the filter value will be explained.

With reference to FIG. 4, the Voronoi calculation unit 330 calculates a Voronoi value for each dot in the screen in which the dot centers are arranged. More specifically, the Voronoi calculation unit 330 includes an area division unit 331, a triangle division unit 333, and a calculation unit 335.

The area division unit 331 divides the screen in which the dot centers are arranged into a plurality of areas. More specifically, the area division unit 331 may divide the screen into the plurality of areas, each of which has one dot center, using a Voronoi division algorithm.

The Voronoi division algorithm is a method of dividing a plane into a plurality of areas. More specifically, in order to perform Voronoi division, a group of points that serve as a center point should exist. Accordingly, the area division unit 331 may perform the Voronoi division using the dot centers arranged by the above-described dot center arrangement unit 320.

Since the screen is repeated on the image vertically and horizontally in an actual halftoning operation, the area division unit 331 creates a new plane of 3 m*3 n in which a screen of m*n is repeated 3*3 times prior to performing the Voronoi division, and performs the Voronoi division with reference to this plane. A screen divided by the Voronoi division is illustrated in FIG. 6.

Grid points on a general screen are distributed in a discrete manner since each of the grid points corresponds to each of the pixels of an image in the halftoning operation. However, in the process of Voronoi division, a corresponding plane is set to have a real number in a horizontal direction and a vertical direction. All points on the plane have respective dot centers in the proximate area. Accordingly, points belonging to one dot center may be created. A set of the points appears on the real number plane in a polygon shape and is referred to as a Voronoi cell. As a result, each side of the polygons created by the area division unit 331 is a combination of equidistance lines between neighboring dot centers.

The triangle division unit 333 divides each of the plurality of divided areas into a plurality of triangles. A detailed operation of the triangle division unit 333 will be explained below with reference to FIG. 7.

Figure 6:
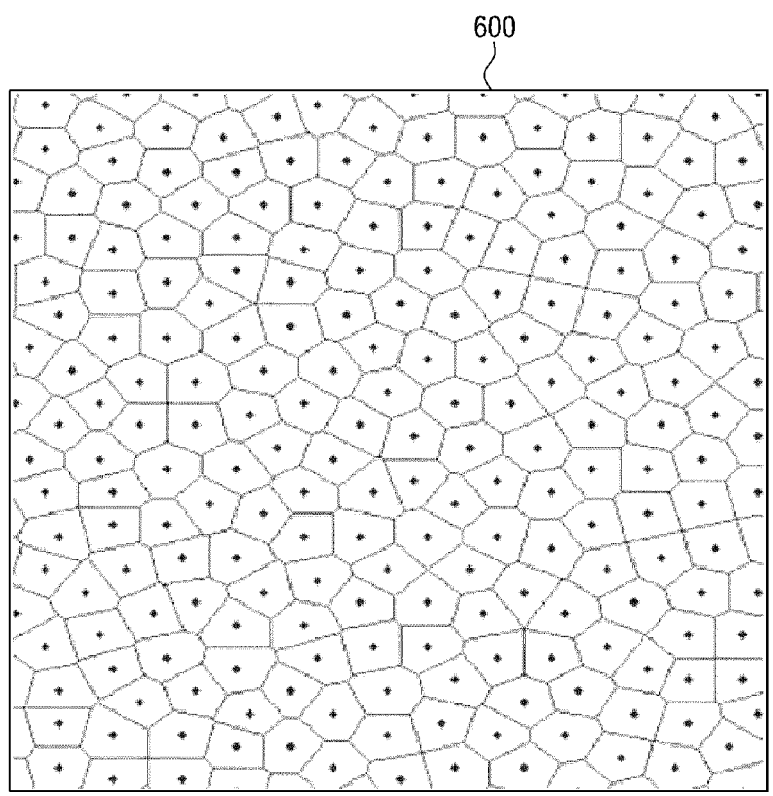
FIG. 6 is a view illustrating an example of a Voronoi-divided screen according to an exemplary embodiment.
Figure 7:
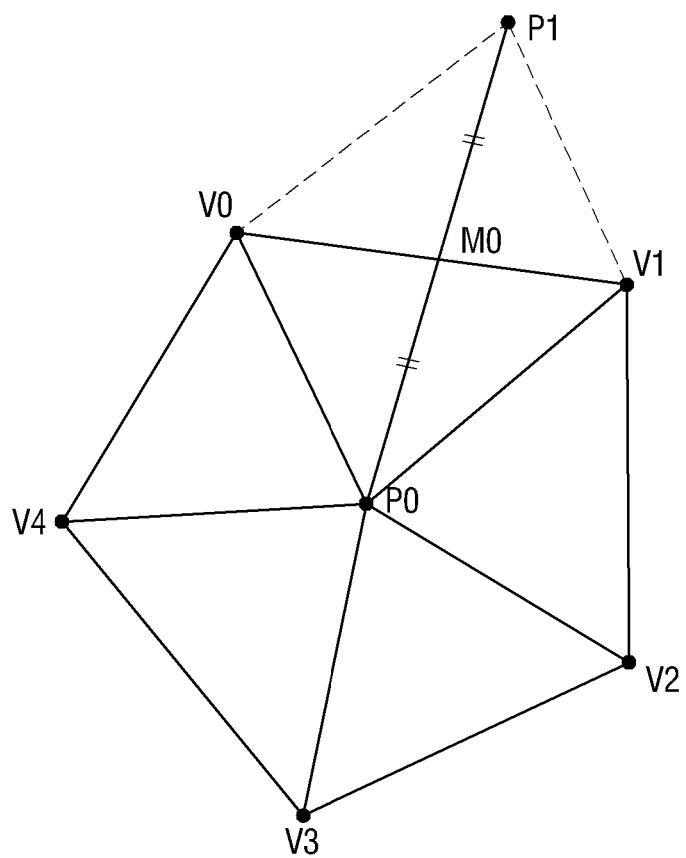
FIG. 7 is an enlarged view of one Voronoi cell of FIG. 6.

FIG. 7 is an enlarged view of one Voronoi cell of FIG. 6. Referring to FIG. 7, the triangle division unit 333 determines a centroid (P0) within the area (that is, a Voronoi cell (V0, V1, V2, V3, V4)) divided by the area division unit 331.

The triangle division unit 333 connects the determined centroid (P0) to vertexes (V0, V1, V2, V3, V4) of the divided area, thereby dividing the Voronoi cell into a plurality of triangles (P0-V1-V2, P0-V2-V3, P0-V3-V4, P0-V4-V0, P0-V0-V1).

The triangle division unit 333 determines an intersection point (M0) of a connecting line between the centroid (P0) and a neighboring centroid (P1) and a line V0-V1 between the vertexes of the divided area, thereby dividing the triangle into two triangles (for example, P0-M0-V1, P0-M0-V0). This process is applied to a centroid of another Voronoi cell. Through this process, the Voronoi cell, as shown in FIG. 7, is divided into 10 triangles. It will be understood that if a Voronoi cell has more or fewer vertices, the Voronoi cell will be divided into more or fewer triangles by the above-described process, e.g., if a Voronoi cell has 6 vertices, the Voronoi cell will be divided into 12 triangles by the above-described process.

The calculation unit 335 calculates a Voronoi value for each dot within the triangle based on a dot position in the triangle. A detailed operation of the calculation unit 335 will be explained below with reference to FIG. 8.

Figure 8:
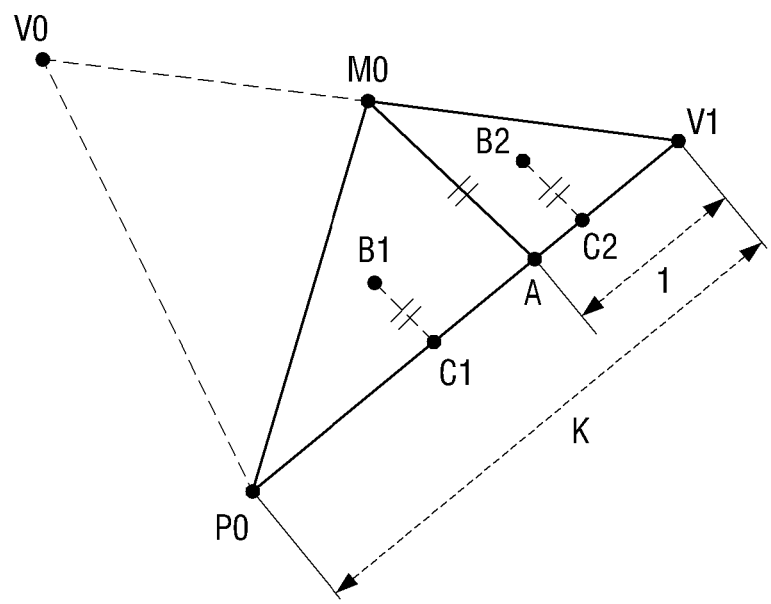
FIG. 8 is a view to explain an operation of calculating a Voronoi value according to an exemplary embodiment.

FIG. 8 is a view to explain an operation of calculating a Voronoi value according to an exemplary embodiment.

The calculation unit 335 calculates a Voronoi value for each dot based on the triangle obtained by the triangle division unit 333.

Prior to calculating the Voronoi value for each dot, the calculation unit 335 obtains a position (A) on a connecting line (P0-V1) between the centroid (P0) and the vertex (V1), which equals to V1A:V1P0=1:k. Herein, 'k' is a constant value for determining a dot growth shape, and as 'k' is greater, the dot grows a in more rounded shape, and as 'k' is smaller, the dot grows in a sharper shape.

The calculation unit 335 calculates the Voronoi value for each dot using the determined position. In a method of calculating a Voronoi value for each dot (for example, a dot (B1)) within a triangle (P0-M0-A), the calculation unit 335 draws a line parallel to the dot (B1) in the triangle (P0-M0-A) and determines a position (C1) on a connecting line (P0-V1) between the centroid (P0) and the vertex (V1). The calculation unit 335 calculates the Voronoi value for the dot (B1) within the triangle (P0-M0-A) using following equation 1:

$$\text{voronoi value} = \frac{\text{distance between } P0 \text{ and } C1}{\text{distance between } P0 \text{ and } A} \quad \text{[Equation 1]}$$

In a method of calculating a Voronoi value for each dot (for example, a dot (B2)) in a triangle (V1-M0-A), the calculation unit 335 draws a line parallel to the dot (B2) within the triangle (V1-M0-A) and determines a position (C2) on a connecting line (P0-V1) between the centroid (P0) and the vertex (V1). The calculation unit 335 calculates the Voronoi value for the dot within the triangle (V1-M0-A) using following equation 2:

$$\text{voronoi value} = m - \frac{\text{distance between } V1 \text{ and } C2}{\text{distance between } V1 \text{ and } A} \quad \text{[Equation 2]}$$

wherein 'm' serves to turn on a pixel within the triangle (V1-M0-A) after turning on a pixel within the triangle (P0-M0-A) in the dot growing process, and has a value greater than or equal to 2, and may be, for example 3.

Figure 9:
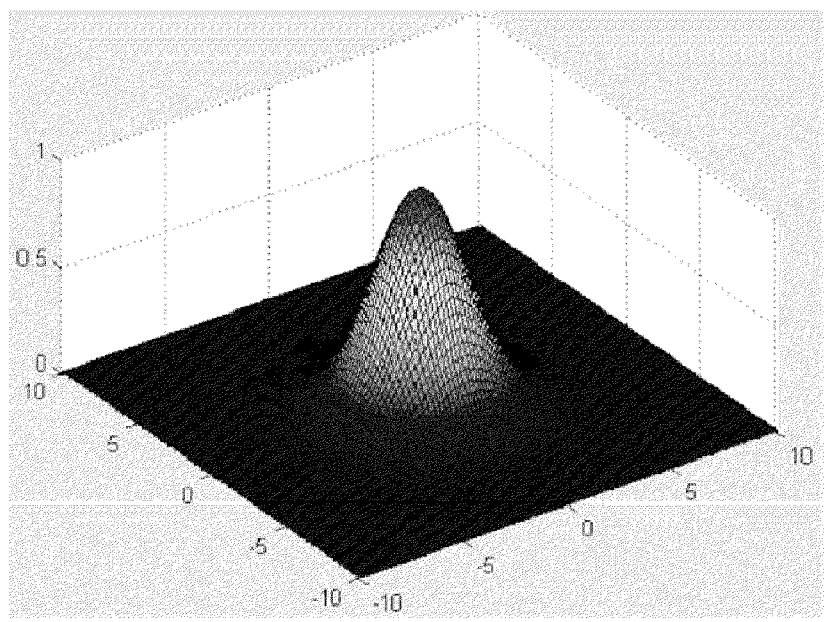
FIG. 9 is a view of an example of a 2-dimensional Gaussian function generated according to an exemplary embodiment.

The filter calculation unit 340 calculates a filter value for each dot within the screen in which the dot centers are arranged. More specifically, the filter calculation unit 340 sets a Gaussian value for each of the plurality of dot centers. An example of a 2-dimensional Gaussian function obtained through this process is illustrated in FIG. 9.

The filter calculation unit 340 may calculate the filter value for each dot within the screen by overlapping the Gaussian values for the plurality of dot centers. Specifically, the filter calculation unit 340 may calculate the filter value for each dot within the screen using following equation 3:

$$G(i, j) = \sum_{k=1}^{n} F(C_i(k) - i, C_j(k) - j) \quad \text{[Equation 3]}$$

wherein G(i,j) is a filter value for a dot (i,j) within the screen, F is a Gaussian function expressed by the following equation 4, Ci(k) is the i coordinate of a kth dot center, Cj(k) is the j coordinate of the kth dot center, and n is the total number of dot centers.

$$F(x,y) = \exp(-(x^2+y^2)/2s^2) \quad \text{[Equation 4]}$$

wherein F(x,y) is a Gaussian filter value for x, y values, and s is a standard deviation of the Gaussian function, which may have a value of, for example, 2.7.

By calculating the filter value for each dot within the screen as described above, the dots to be turned on are more uniformly distributed on the screen. In other words, the filter value may perform an operation of a low pass filter when the screen is produced. More specifically, if the screen is produced using only the Voronoi value, in other words, if the dot is turned on in an ascending order of the Voronoi value, the dot clusters are not turned on with a uniform distribution. This is because the centroid and the vertex are positioned on a real number grid, but a position in which the pixel is actually turned on is limited due to limitation of resolution.

The dot value setting unit 350 sets a dot value within the screen based on the calculated Voronoi value and the calculated filter value. More specifically, the dot value setting unit 350 weights the Voronoi value and the filter value calculated for each dot within the screen, and totals up the weighted values. That is, the dot value setting unit 350 may calculate a sum value of weighted values for each dot within the screen as in following equation 5:

$$W(i,j)=w_V V(i,j)+w_G G(i,j) \qquad \text{[Equation 5]}$$

wherein W(i,j) is a sum value of weighted values of a dot (i,j) within the screen, V(i,j) is a Voronoi value of the dot (i,j) within the screen, G(i,j) is a filter value of the dot (i,j) within the screen, $w_V$ is a weight of the Voronoi value, and $w_G$ is a weight of the filter value.

$w_V$ may be, for example, 0.4, and $w_G$ may be, for example, 0.6. The weight of the Voronoi value and the weight of the filter value may vary during the dot growing process. For example, $w_V$ may be 0.4 and $w_G$ may be 0.6 until 70% of the total dots within the screen are turned on, and $w_V$ may be 0 and $w_G$ may be 1 after 70% of the total dots are turned on. By changing the weight during the dot growing process, the quality of the image can be increased and/or brightened.

The dot value setting unit 350 may set the dot value for a dot having a lowest sum value of weighted values among the sum values of weighted values for the dots within the screen. That is, one dot having the lowest sum value of weighted values is turned on.

If the dot values are not set for all of the dots within the screen, the controller 360 may control the Voronoi calculation unit 330, the filter calculation unit 340, and the dot value setting unit 350 to repeat the above-described operations until the dot values are set for all of the dots within the screen. More specifically, the controller 360 may analyze the screen output from the dot value setting unit 350 and determine whether all of the dots within the screen are turned on, and if all of the dots are not turned on, the controller 360 may control the filter calculation unit 340 and the dot value setting unit 350 to recalculate the Voronoi value and the filter value for each pixel and turn on one dot.

The controller 360 may change the weight of the Voronoi value and the weight of the filter value according to a ratio of the turned-on dots to the total dots as described above.

If all of the dots are turned on, the controller 360 stores the corresponding screen in the storage unit 130 of the print controlling apparatus 100, the storage unit 230 of the image forming apparatus 200, and/or the screen memory 152 of the rendering unit 250, for use in the halftoning process.

The halftone screen producing apparatus 300 as described above can produce the stochastic screen based on the Voronoi division under a low-resolution environment, and as a result, using the screen, an image that does not incur moiré and/or low frequency noise is output under the low-resolution environment and as a result, the quality of the output image may be improved.

Figure 10:
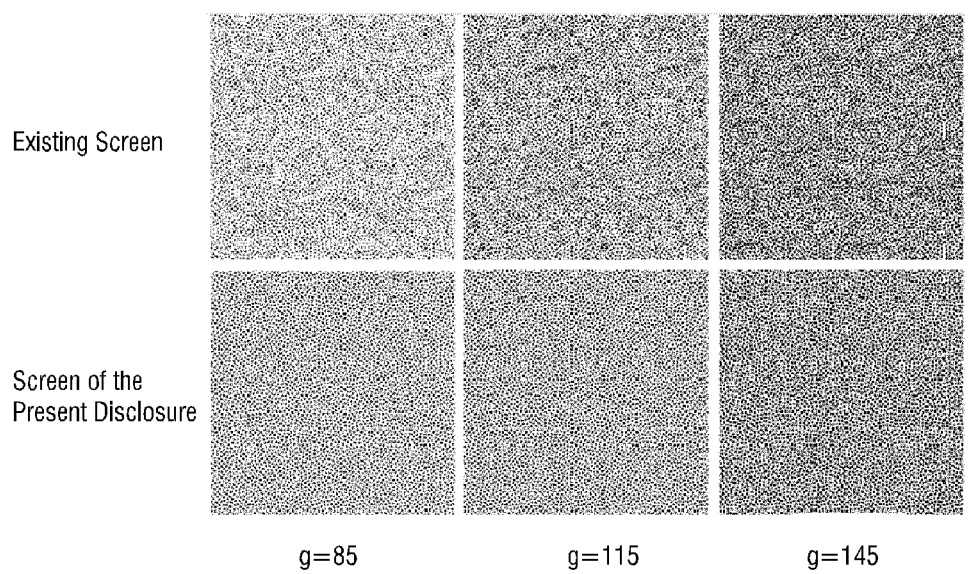
FIG. 10 is a view comparing an output result of a related art stochastic screen and an output result a halftone screen generated according to an exemplary embodiment.

FIG. 10 is a view comparing an output result of a related art stochastic screen and an output result of the halftone screen according to aspects of the present invention. More specifically, FIG. 10 illustrates output results of the related art stochastic screen of 128*128 and the halftone screen according to aspects of the present invention, if resolution is 600 dpi and gray levels are 85, 115, and 145, respectively.

Referring to FIG. 10, on the related art stochastic screen, dots of low Voronoi values are concentrated at a specific position due to an effect of low resolution and it can be seen that there is low frequency noise. On the other hand, since the halftone screen according to aspects of the present invention is produced considering the Voronoi value and the filter value, the dots are more uniformly distributed and it can be seen that there is less low frequency noise.

Figure 11:
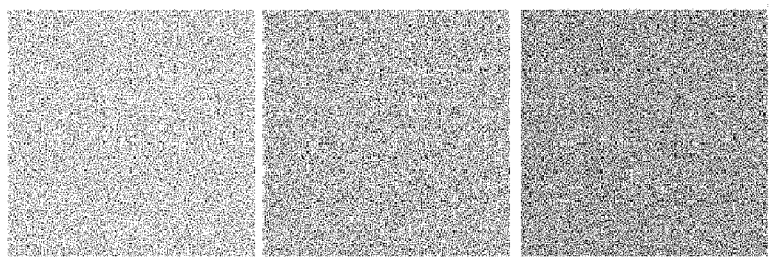
FIG. 11 is a view illustrating output results of the halftone screen according to gray levels according to an exemplary embodiment.
Figure 11:
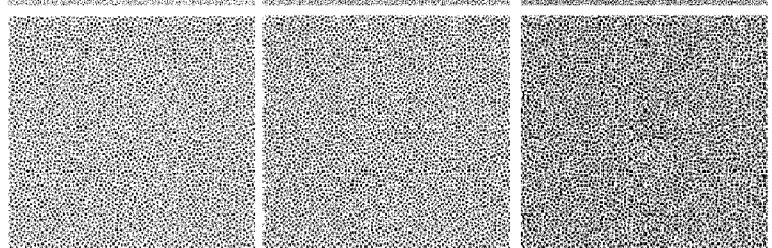

FIG. 11 is a view illustrating output results of the halftone screen produced according to aspects of the present invention, for each gray level. More specifically, FIG. 11 illustrates results of outputting the halftone screen according to aspects of the present invention according to the screen frequency in grays levels of 85, 115, and 145, respectively, of frequencies of 150 Ipi and 200 Ipi, respectively, at a resolution of 600 dpi. Referring to FIG. 11, it can be seen that even on the screen of 200 Ipi, which can be regarded as a high frequency screen by general laser printer standards, a uniform pattern is reproduced.

Figure 12:
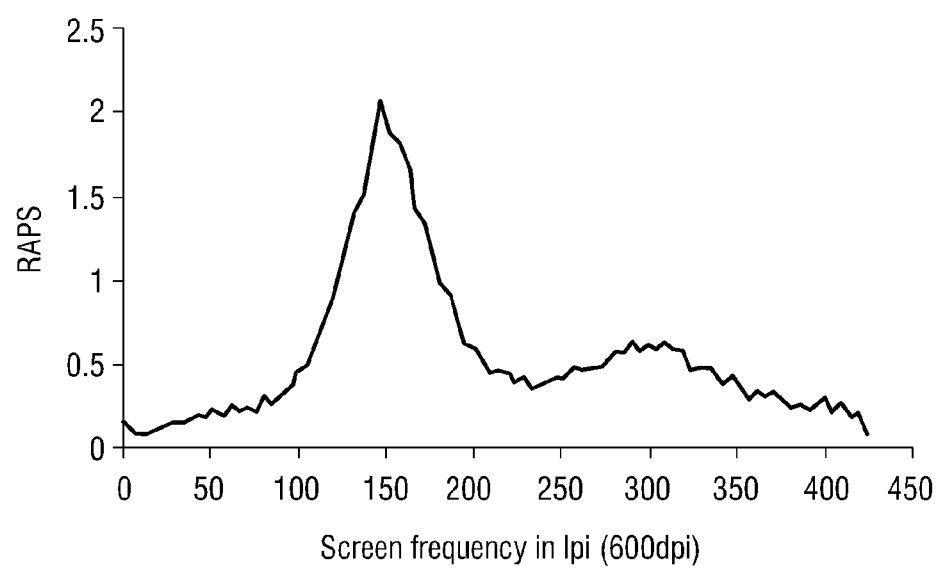
FIG. 12 is a view illustrating a frequency response of the halftone screen generated according to an exemplary embodiment.

FIG. 12 is a view illustrating a frequency response of the halftone screen produced according to aspects of the present invention. More specifically, FIG. 12 illustrates a radially averaged power spectrum (RAPS) of the halftone screen according to aspects of the present invention, if the frequency is 150 Ipi, the resolution is 600 dpi, and the gray level is 115. Referring to FIG. 12, in the halftone screen according to the present exemplary embodiment, the RAPS peaks at about 150 Ipi and it can be seen that a principal frequency is about 150 Ipi.

Figure 13:
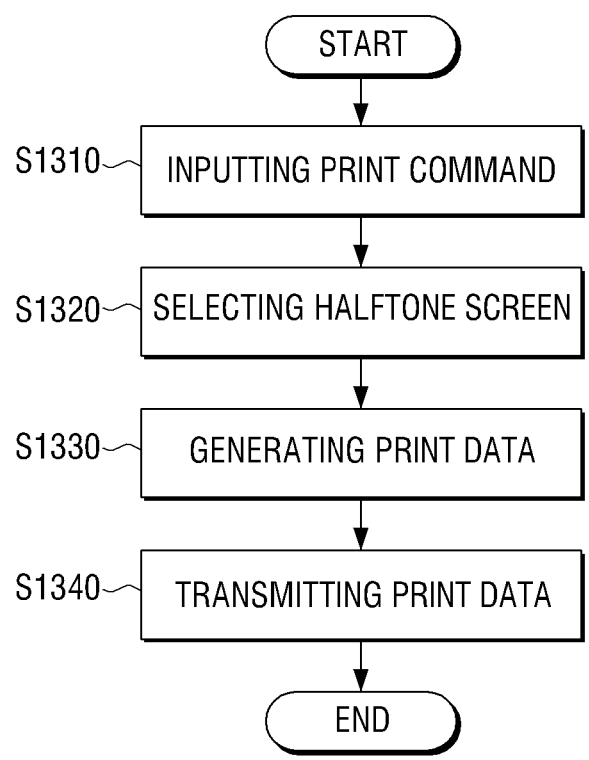
FIG. 13 is a flowchart illustrating a print controlling method according to an exemplary embodiment.

FIG. 13 is a flowchart illustrating a print controlling method according to an exemplary embodiment. A command to print a document is input by a user (S1310). At this time, a print option for the corresponding document may be set.

A halftone screen to be applied to the document is selected from among at least one halftone screen (S1320). One or more halftone screens may be stored and/or selected or the one or more halftone screens may be generated and then selected. More specifically, considering the print option selected by the user, the halftone screen to be applied to the document, for which the command to print is input, is selected from at least one pre-stored and/or generated halftone screens. For example, if high quality printing is desired, a halftone screen having a high screen frequency is selected, and if normal printing or high speed printing is desired, a halftone screen having a low screen frequency is selected. The pre-stored and/or generated halftone screen is a stochastic screen to which the Voronoi division and the low pass filter are applied, and which is produced by the above-described halftone screen producing apparatus 300.

Print data for the document is generated by applying the halftone screen (S1330). More specifically, the print data may be generated by rendering the document using the selected halftone screen. Halftoning is performed using the halftone screen selected in the print controlling apparatus 100, but, if the halftoning is performed in the image forming apparatus 200, print data including information on the selected halftone screen may be generated.

The generated print data is transmitted to the image forming apparatus (S1340). The generated print data may be stored. More specifically, the generated print data may be stored so that the document selected by the user may be output repeatedly.

Accordingly, an image is output using the halftone screen that decreases incidence of moiré and/or low frequency noise even when low-resolution printing is performed, and as a result, quality of an output image can be increased. The print controlling method of FIG. 13 may be performed in the print controlling apparatus as shown in FIG. 1, but may be performed in any other print controlling apparatus.

The print controlling method described above may be realized by at least one execution program for executing the above-described print controlling method and the execution program may be stored in a non-transitory computer-readable recording medium.

Figure 14:
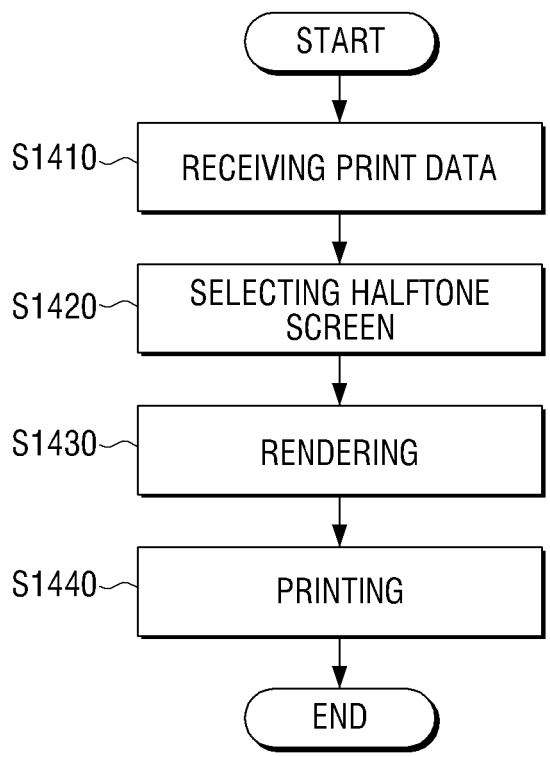
FIG. 14 is a flowchart illustrating an image forming method according to an exemplary embodiment.

FIG. 14 is a flowchart illustrating an image forming method according to an exemplary embodiment. Print data is received (S1410) and a halftone screen to be applied to the received print data is selected from at least one halftone screens (S1420). One or more halftone screens may be stored and/or selected or the one or more halftone screens may be generated and then selected. More specifically, considering a print option set for the print data, the halftone screen to be applied to the received print data is selected from of the at least one pre-stored and/or generated halftone screens. For example, if high quality printing is desired, a halftone screen having a high screen frequency may be selected, and if normal printing or high speed printing is desired, a halftone screen having a low screen frequency may be selected. The pre-stored and/or generated halftone screen is a stochastic screen to which the Voronoi division and the low pass filter are applied, and which is produced by the above-described halftone screen producing apparatus 300.

The print data is rendered by applying the selected halftone screen (S1430). More specifically, the rendering is performed by performing halftoning with respect to the print data using the halftone screen selected operation S1420. The rendered print data is printed (S1440).

Accordingly, the image forming method outputs an image using the halftone screen that decreases incidence of moiré and/or low frequency noise when printing at low resolution, and as a result, the quality of an output image cam be increased. Also, the image forming method of FIG. 14 may be performed in the image forming apparatus as shown in FIG. 2 and may also be performed in any other image forming apparatus.

The above-described image forming method may be realized by at least one execution program for executing the above-described image forming method and the execution program may be stored in a non-transitory computer-readable recording medium.

Figure 15:
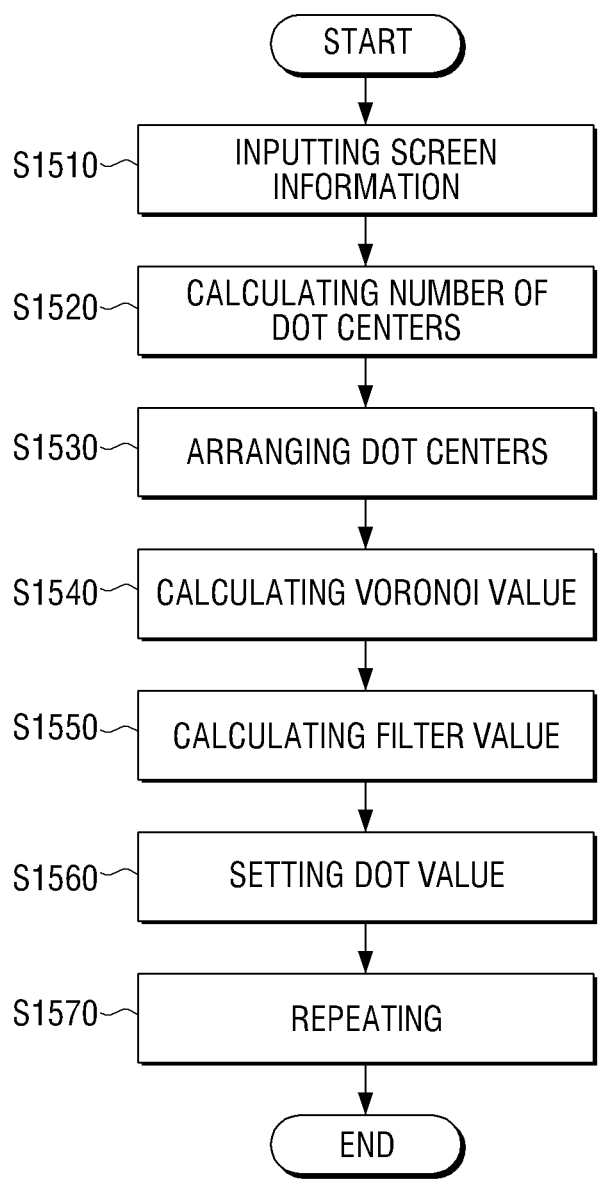
FIG. 15 is a flowchart illustrating a halftone screen producing method according to an exemplary embodiment.

FIG. 15 is a flowchart illustrating a halftone screen producing method according to an exemplary embodiment. Referring to FIG. 15, screen information is input (S1510). The screen information may be information on a screen, such as a screen size, a screen frequency, a constant value for determining a dot growth shape, and the number of dot centers.

The number of dot centers is calculated based on the screen size and the screen frequency of the screen information (S1520). Based on the screen information, dot centers are arranged within the screen (S1530). More specifically, the dot centers are arranged on the screen using a direct binary search (DBS) algorithm for the calculated number of dot centers.

A Voronoi value for each dot within the screen in which the dot centers are arranged is calculated (S1540). More specifically, the screen in which the dot centers are arranged is divided into a plurality of areas and each of the divided areas is divided into a plurality of triangles. Then, based on a dot position within the divided triangle, a Voronoi value for each dot within the divided triangle is calculated. Such an operation of calculating the Voronoi value has been described above with reference to FIG. 3 and thus further explanation is omitted.

A filter value for each dot within the screen in which the dot centers are arranged is calculated (S1550). More specifically, a Gaussian value is set for each of the plurality of dot centers. A filter value for each dot within the screen is calculated by overlapping the Gaussian values for the plurality of dot centers. In other words, the filter value for each dot within the screen may be calculated using above-described Equation 3.

Based on the calculated Voronoi value and the calculated filter value, a dot value within the screen is set (S1560). More specifically, the Voronoi value and the filter value for each dot within the screen are weighted and a sum of the weighted values is obtained. In other words, the sum of the weighted values for each dot within the screen is calculated using above Equation 5 and the dot value is set for the dot having the lowest sum value of weighted values for each dot in the screen. That is, the dot having the lowest sum value of weighted values is turned on.

If the dot values are not set for all of the dots within the screen, the operations of calculating the filter value and setting the dot value are repeated until the dot values are set for all of the dots (S1570).

Accordingly, the halftone screen producing method produces the stochastic screen based on the Voronoi division under a low-resolution environment and thus outputs an image with a decreased incidence of moiré and/or low frequency noise even under the low-resolution environment, and as a result, the quality of an output image can be increased. The halftone screen producing method of FIG. 15 may be performed in the halftone screen producing apparatus as shown in FIG. 4 and may be performed in any other halftone screen producing apparatus.

Also, the above-described halftone screen producing method may be realized by at least one execution program for executing the above-described halftone screen producing method, and the execution program may be stored in a non-transitory computer-readable recording medium.

Figure 16:
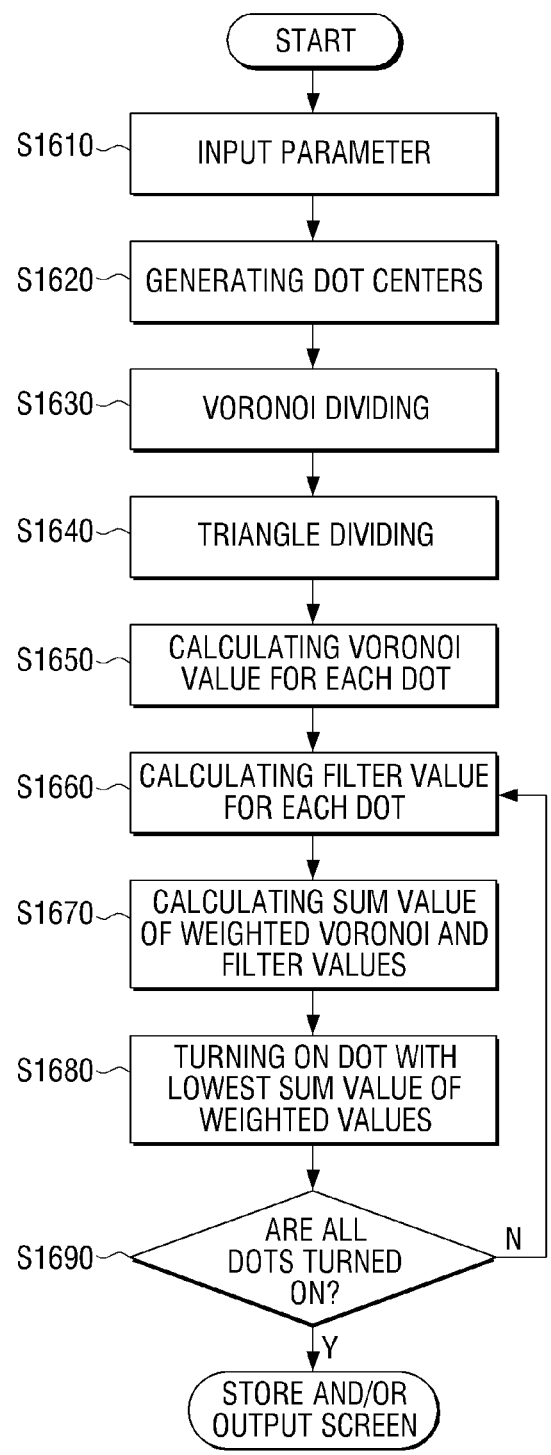
FIG. 16 is a flowchart illustrating a halftone screen producing method according to an exemplary embodiment.

FIG. 16 is a flowchart illustrating a halftone screen producing method according to an exemplary embodiment. An input parameter is input (S1610). The input parameter may indicate a screen size, a screen frequency, a constant value for determining a dot growth shape, and the number of dot centers.

A dot center is generated (S1620). More specifically, the number of dot centers is calculated based on the input parameter and the dot centers are arranged within a screen using a DBS algorithm for the calculated number of dot centers.

Voronoi division is performed (S1630). More specifically, the screen in which the dot centers are arranged is divided into a plurality of areas using a Voronoi division algorithm.

Triangle division is performed (S1640). The operation of dividing the triangle has been described above with reference to FIG. 7 and thus further explanation is omitted.

A Voronoi value for each dot is calculated (S1650). The operation of calculating the Voronoi value for each dot has been described above with reference to FIG. 8 and thus further explanation is omitted.

A filter value for each dot is calculated (S1660). More specifically, a Gaussian value is set for each of the plurality of dot centers and the filter value for each dot is calculated by overlapping the Gaussian values for the plurality of dot centers.

A sum of the weighted Voronoi value and the weighted filter value is calculated (S1670). The Voronoi value and the filter value for each dot are weighted and the sum of the weighted values is calculated.

A dot having the lowest sum of the weighted values is turned on (S1680). More specifically, the dot value is set for the dot having the lowest sum of the weighted values among the sums of the weighted values calculated for the dots within the screen.

It is determined whether all of the dots on the screen are turned on (S1690), and if all of the dots are not turned on (S1690-N), the operations of calculating the filter value (S1660), calculating the sum of the weighted values (S1670), and turning on the dot are repeated (S1680).

On the other hand, if all of the dots within the screen are turned on, the produced halftone screen is stored and/or output (S1690-Y).

Accordingly, the halftone screen producing method produces the stochastic screen based on the Voronoi division under a low-resolution environment and thus outputs an image with decreased incidence of moiré and/or low frequency noise under the low-resolution environment, and as a result, the quality of the output image can be increased. The halftone screen producing method of FIG. 16 may be performed in the halftone screen producing apparatus as shown in FIG. 4 and may be performed in any other halftone screen producing apparatus.

Also, the above-described halftone screen producing method may be realized by at least one execution program for executing the above-described halftone screen producing method and the execution program may be stored in a non-transitory computer-readable recording medium. Accordingly, each block of the present general inventive concept may be embodied as a computer recordable code on a non-transitory computer-readable recording medium. The non-transitory computer-readable recording medium may be a device storing data readable by a computer system. For example, the non-transitory computer-readable recording medium may be a read only memory (ROM), a random access memory (RAM), a CD-ROM, a magnetic tape, a floppy disk, an optical disk, an optical data storage device, and a video display apparatus, such as a television having the above storage device.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A print controlling apparatus connectable to an image forming apparatus, the print controlling apparatus comprising:
   a user interface unit to receive a command to print a document;
   a print data generation unit to generate print data for the document by applying a halftone screen; and
   a communication interface unit to transmit the generated print data to the image forming apparatus,
   wherein the halftone screen is a stochastic screen to which a Voronoi division and a low pass filter are applied, and
   wherein the halftone screen is based on a sum value of a weighted Voronoi value calculated for each dot and a weighted filter value calculated for each dot within the screen, and the weight value of the Voronoi value and the weight value of the filter value are inversely variable throughout the process.

2. The print controlling apparatus of claim 1, further comprising:
   a storage unit to store at least one halftone screen; and
   a screen selection unit to select a halftone screen to be applied to the document from the at least one halftone screen stored in the storage unit,
   wherein the user interface unit receives a print option,
   wherein the screen selection unit selects the halftone screen according to print option information, the print option information comprising print quality, whether color printing is performed, and whether an edge is improved,
   wherein the print data generation unit generates the print data using the selected halftone screen.

3. An image forming apparatus connectable to a print controlling apparatus, the image forming apparatus comprising:
   a communication interface unit to receive print data;
   a rendering unit to render the received print data by applying a halftone screen; and
   an image forming unit to output the rendered print data,
   wherein the halftone screen is a stochastic screen to which a Voronoi division and a low pass filter are applied, and
   wherein the halftone screen is based on a sum value of a weighted Voronoi value calculated for each dot and a weighted filter value calculated for each dot within the screen, and the weight value of the Voronoi value and the weight value of the filter value are inversely variable throughout the process.

4. The image forming apparatus of claim 3, further comprising:
   a storage unit to store at least one halftone screen; and
   a screen selection unit to select a halftone screen to be applied to the print data from the at least one halftone screen stored in the storage unit,
   wherein the screen selection unit selects the halftone screen according to print option information, the print option information comprising print quality, whether color printing is performed, and whether an edge is improved,
   wherein the rendering unit renders the print data using the selected halftone screen.

5. A print controlling method, comprising:
   receiving a command to print a document;
   generating a halftone screen, the generating comprising:
      receiving screen information;
      arranging dot centers within a screen based on the screen information;
      calculating a Voronoi value for each dot within the screen in which the dot centers are arranged;
      calculating a filter value for each dot within the screen in which the dot centers are arranged;
      setting a dot value within the screen based on the calculated Voronoi value and the calculated filter value; and
      if values are not set for all of the dots within the screen, repeating the calculating of the filter value and the setting of the dot value until values are set for all of the dots within the screen;
   generating print data for the document by applying the halftone screen; and
   transmitting the generated print data,
   wherein the halftone screen is a stochastic screen to which a Voronoi division and a low pass filter are applied.

6. The print controlling method of claim 5, further comprising:
   receiving a selection of a print option to be applied to the document; and
   selecting a halftone screen to be applied to the document from at least one pre-stored halftone screen,
   wherein the selecting comprises selecting the halftone screen according to print option information, the print option information comprising print quality, whether color printing is performed, and whether an edge is improved, and
   wherein the generating the print data comprises generating the print data using the selected halftone screen.

7. The print controlling method of claim 5, wherein the halftone screen is based on a sum value of a weighted Voronoi value and a weighted filter value for each dot within a screen.

8. The print controlling method of claim 5, wherein the calculating the filter value comprises:
setting a Gaussian value for each of the plurality of dot centers;
overlapping the Gaussian values for the plurality of dot centers; and
calculating the filter value for each dot within the screen.

9. The print controlling method of claim 8, wherein the calculating the filter value comprises calculating the filter value for each dot within the screen according to the following equation:

$$G(i, j) = \sum_{k=1}^{n} F(C_i(k) - i, C_j(k) - j)$$

wherein G(i,j) is a filter value for a dot (i,j) within a screen, F is a Gaussian filter, Ci(k) is an i coordinate of a kth dot center, Cj(k) is a j coordinate of the kth dot center, and n is a total number of dot centers.

10. An image forming method, comprising:
receiving print data;
rendering the received print data by applying a halftone screen; and
printing the rendered print data,
wherein the halftone screen is a stochastic screen to which a Voronoi division and a low pass filter are applied, and
wherein the halftone screen is based on a sum value of a weighted Voronoi value calculated for each dot and a weighted filter value calculated for each dot within the screen, and the weight value of the Voronoi value and the weight value of the filter value are inversely variable throughout the process.

11. The image forming method of claim 10, further comprising:
selecting a halftone screen to be applied to the print data from at least one pre-stored halftone screen,
wherein the selecting comprises selecting the halftone screen according to print option information, the print option information comprising print quality, whether color printing is performed, and whether an edge is improved, and
wherein the rendering comprises rendering the print data using the selected halftone screen.

12. An image forming method, comprising:
receiving print data;
rendering the received print data by applying a halftone screen;
printing the rendered data; and
generating the halftone screen, the generating comprising:
receiving screen information;
arranging dot centers within a screen based on the received screen information;
calculating a Voronoi value for each dot within the screen in which the dot centers are arranged;
calculating a filter value for each dot within the screen in which the dot centers are arranged;
setting a dot value within the screen based on the calculated Voronoi value and the calculated filter value; and
if values are not set for all of the dots within the screen, repeating the calculating of the filter value and the setting of the dot value until values are set for all of the dots within the screen,
wherein the halftone screen is a stochastic screen to which a Voronoi division and a low pass filter are applied.

13. The image forming method of claim 12, wherein the calculating the filter value comprises:
setting a Gaussian value for each of the plurality of dot centers;
overlapping the Gaussian values for the plurality of dot centers; and
calculating the filter value for each dot within the screen.

14. The image forming method of claim 13, wherein the calculating the filter value comprises calculating the filter value for each dot within the screen according to the following equation:

$$G(i, j) = \sum_{k=1}^{n} F(C_i(k) - i, C_j(k) - j)$$

wherein G(i,j) is a filter value for a dot (i,j) within the screen, F is a Gaussian filter, Ci(k) is an i coordinate of a kth dot center, Cj(k) is a j coordinate of the kth dot center, and n is a total number of dot centers.

15. A non-transitory computer-readable recording medium comprising a program for executing a print controlling method, the print controlling method comprising:
receiving a command to print a document;
generating print data for the document by applying a halftone screen; and
transmitting the generated print data,
wherein the halftone screen is a stochastic screen to which a Voronoi division and low pass filter are applied, and
wherein the halftone screen is based on a sum value of a weighted Voronoi value calculated for each dot and a weighted filter value calculated for each dot within the screen, and the weight value of the Voronoi value and the weight value of the filter value are inversely variable throughout the process.

16. A non-transitory computer-readable recording medium comprising a program for executing an image forming method, the image forming method comprising:
receiving print data;
rendering the received print data by applying a halftone screen; and
printing the rendered print data,
wherein the halftone screen is a stochastic screen to which a Voronoi division and low pass filter are applied, and
wherein the halftone screen is based on a sum value of a weighted Voronoi value calculated for each dot and a weighted filter value calculated for each dot within the screen, and the weight value of the Voronoi value and the weight value of the filter value are inversely variable throughout the process.

* * * * *